Aug. 9, 1960 W. P. FOSTER 2,948,849
METHOD AND APPARATUS FOR MEASURING APPARENT CORONA CHARGE
Filed June 27, 1957 3 Sheets-Sheet 1

INVENTOR:
WILLIAM P. FOSTER
BY
Howson & Howson
ATTYS.

INVENTOR:
WILLIAM P. FOSTER
BY Howson & Howson
ATTYS.

United States Patent Office 2,948,849
Patented Aug. 9, 1960

2,948,849

METHOD AND APPARATUS FOR MEASURING APPARENT CORONA CHARGE

William P. Foster, Lansdowne, Pa., assignor to James G. Biddle Company, Philadelphia, Pa., a corporation of Pennsylvania Filed June 27, 1957, Ser. No. 668,395

12 Claims. (Cl. 324—54)

This invention relates to equipment for detecting the presence of corona discharge and measuring the value of the apparent charge. The invention is applicable in such electrical equipment as cables, transformers, motors, switch gear and wiring. It also relates to the method of calibrating the apparatus and to the method of measuring corona charge.

A corona discharge in a dielectric structure causes a sudden step change in voltage at the terminals on the structure. The product of this voltage change and the capacitance of the structure is called the apparent corona charge.

Heretofore, apparent corona charge has been determined by measuring step voltage at the terminals of a dielectric structure, measuring the capacitance of the structure and taking their product. Equipment in the prior art has been calibrated by applying a known step voltage to the input terminals of the equipment and noting the amplitude of the output. This method has several difficulties perhaps the greatest of which is the difficulty in performing calibration without the specimen in place, because the presence of the specimen affects the sensitivity of the equipment. Finally, measurement of the capacitance of the specimen, particularly when it is small or the capacitance is distributed, is difficult.

The present invention provides a system which permits direct determination of the apparent corona charge. This invention also provides apparatus which is relatively simple and easily used. Moreover, with this invention the capacitance of the specimen need not be measured.

More specifically, this invention relates to a corona test set having a corona free voltage source and a pair of terminals, one of which is ground, for applying test voltage from the source across the test sample or specimen. A corona free capacitor, known as the calibrating capacitor, and a terminating impedance are placed in series to form a signal generator circuit branch across the test sample terminals and are so arranged that the impedance is on the low potential side of the calibrating capacitor to permit grounding of the signal generator. The signal generator, designed to generate a calibrating voltage, is connected across the terminating impedance of this circuit branch which is preferably selected such that it provides a suitable termination for the transmission line from the generator. Another impedance, known as the power separation filter, is connected in parallel with the terminals and the signal generator circuit branch to do a number of things including detecting both the calibrating voltage and the corona signal. Finally, a voltage amplitude detecting means is connected across a capacitive part of this impedance to afford a measurement of the specimen test voltage.

The equipment is preferably associated with the voltage supply transformer tank which is adapted to enclose the transformer in oil and which provides bushings through which the high voltage leads pass. Such a combination provides a compactness of equipment. The bushings preferably contain capacitors which form elements of the signal generator circuit and the power separation filter branches connected in parallel across the test terminals. The capacitor bushing for the signal generator branch may be the calibrating capacitor, whereas the capacitor bushing for the power separation filter may serve with another capacitor in that branch as a voltage divider. It is desirable that the terminating impedance in the signal generator circuit branch be of a size to properly terminate the coaxial cable which is preferably used as transmission line from the signal generator. The calibrating signal generator may be a variety of types, but it is preferably a square wave generator or pulse generator having a rise time sufficiently fast that the slope of the pulse will have no significant effect on the performance of the equipment. As a practical matter, this means that the rise time should be better than 100 millimicroseconds.

The method of the present invention involves measurement of the apparent corona charge of a test sample by simultaneously applying a test voltage across the sample and a calibrating signal across a terminating impedance connected to ground and in series with calibrating capacitance across the sample. The signal generator is then adjusted until the amplitude of the calibrating signal equals the amplitude of the actual corona pulse. At this point, the apparent corona charge is equal to the product of the measured value of the calibrating voltage from the signal generator and the known capacitance of the calibrating capacitor.

The adjustment described is conveniently done using an oscilloscope as a corona detector across an inductive element in the detector branch of the circuit which is in parallel with the sample being tested. The pulses resulting from the apparent corona discharge and those resulting from the signal generator will be superimposed on the screen of the oscilloscope, and the two may be visually adjusted until they are equal in amplitude. It will be demonstrated hereafter that this results in a representation of the apparent corona charge or the product of calibrating voltage and the calibrating capacitor in series with the terminating impedance.

For a better understanding of the present invention, reference is made to the following drawings, in which:

Fig. 9 is a fragmentary view showing pulses formed on the screen of a cathode ray oscilloscope in the course of corona test.

Figure 1:
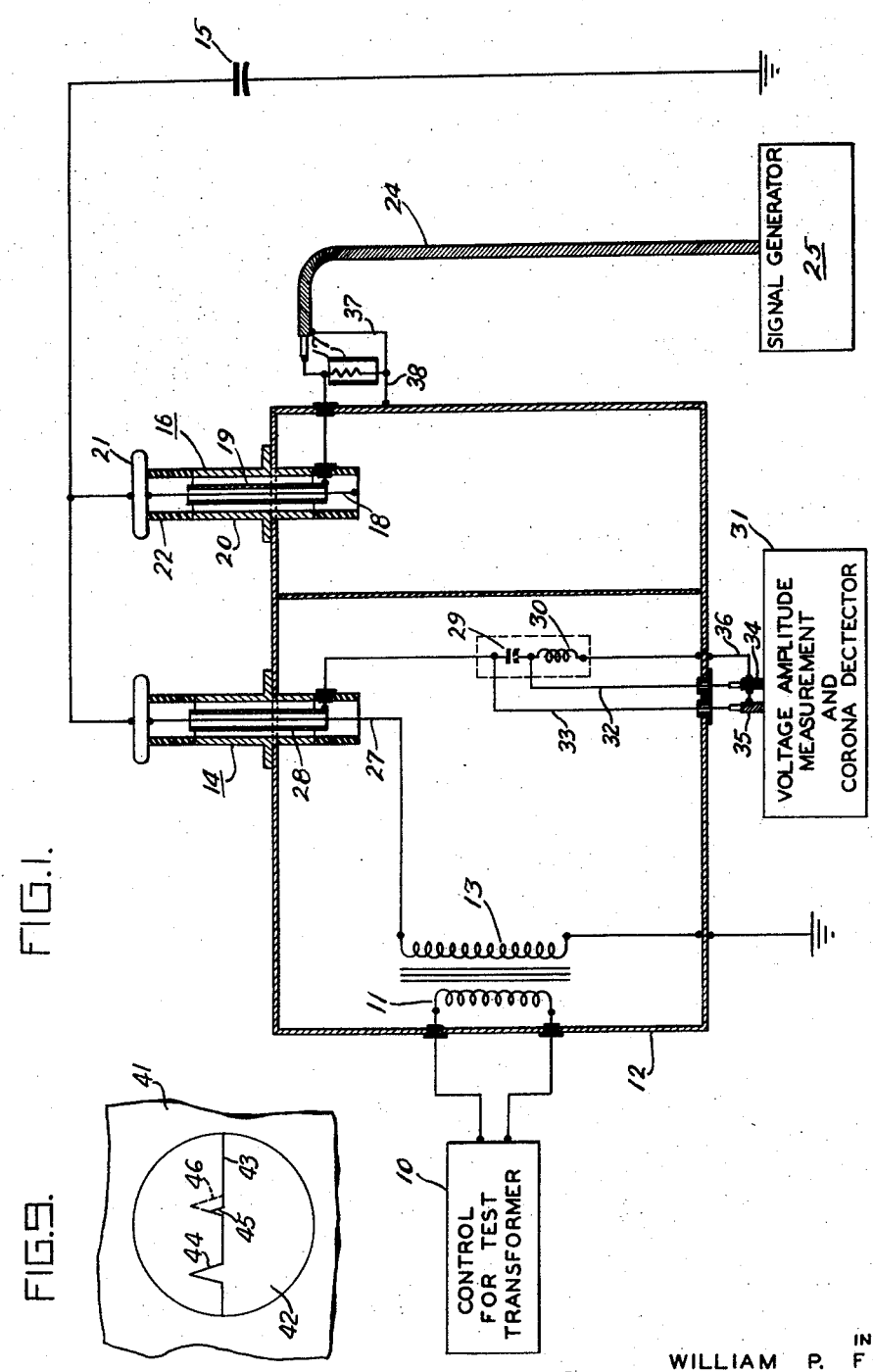
Fig. 1 is a schematic representation of a possible arrangement of test apparatus according to the present invention.

Referring to Fig. 1, a preferred type of apparatus is illustrated. Here it will be seen that energy is supplied through a control at a relatively low frequency such as 60 cycles for the test transformer 10 to the primary 11 of the test transformer which is enclosed in a grounded metallic casing 12. The secondary 13 of the input transformer is connected to ground through the casing at one side and through bushing 14 at its other side to a specimen 15 or test sample which is illustrated as a capacitance. The sample, in turn, is connected to ground.

In parallel with the sample 15 is a simple series circuit involving a calibrating capacitor which is advantageously part of bushing 16 and a resistance 17 connected in series to ground with the resistance having one side connected directly to ground. The bushing 16 has fed through it a line 18, which is shown axially in position, which is at the potential of the terminal connected to the sample 15. Surrounding this lead 18 is a tube 19 which together with the lead constitutes a corona free capacitor which may be designed to be of a suitable capacitance to act as a calibrating capacitor. This tube 19, in turn, is surrounded by the bushing housing including a portion 20 which is connected to the casing ground and which is separated from the high voltage end 21 by a suitable stand-off insulator 22. Plate 19 of the calibrating capacitance is connected to resistor 17 which as shown may be outside of a tank.

Resistance 17 may be, and preferably is, a suitable terminating impedance for the transmission line 24 which connects the adjustable signal generator 25 across the resistance 17. The transmission line is preferably a coaxial cable. The signal generator preferably produces square waves or pulse chains having steep rises as previously mentioned.

Bushing 14 is preferably similar to bushing 16 except that internally of the tank no connection is made to the high voltage lead 18. Whereas the corresponding lead 27 in bushing 14 is connected to transformer secondary 13. It may have a tubular capacitor plate 28 associated with the high voltage "plate" 27, however, to form another corona free capacitance in the same way as "plates" 18 and 19 form such a capacitor. Plate 28 of the capacitor in this instance is connected through an impedance consisting of capacitor 29 and inductance 30 which, in turn, are connected to ground. Across the inductance 30 is connected a corona amplitude detector 31 which is used to compare the corona ampliude produced by the test voltage and the signal generator voltage, and advantageously the corona detector is an oscilloscope which permits simultaneous comparison of the voltage amplitudes on its screen. The signal generator and the corona pulse signal voltage may be read simultaneously or may be read sequentially on the same oscilloscope.

It will be appreciated that the voltage amplitude measurement in corona detector 31 is preferably a combination voltmeter and oscilloscope. The voltmeter is connected across the capacitance 29 by means of lines 32 and 33 to detector 31 and the oscilloscope is connected across the inductance 30 by line 32 and by line 36 which connects grounded sheaths 34 and 35 to the grounded casing of the tank 12 to which one end of inductance 30 is also connected.

In a similar manner, the sheath cable 24 is grounded through conductor 37 which is connected to conductor 38 which couples one of resistors 17 to the grounded casing 12.

Calibration is accomplished simply by adjusting the signal generator until the amplitude of its signals corresponds to the amplitude of the corona pulse signal, at which point the voltage of the signal generator times the capacitance of the calibrating capacitance equals the apparent corona charge. This, of course, is an approximation but it is a highly accurate one, giving results better than have heretofore been available by any known equipment. The specific technique involved will be touched upon again in connection with a consideration of Fig. 9.

To facilitate an understanding of the mathematical basis of the method and device of the present invention, the relationship described will be derived below with reference to Figs. 2–8.

Figure 2:
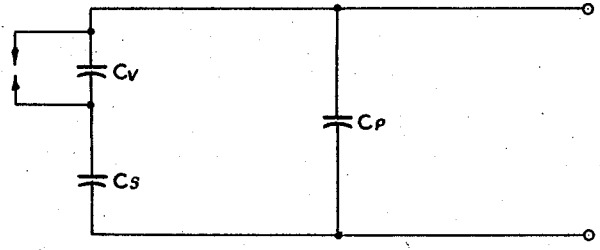
Fig. 2 is a schematic circuit arrangement showing an equivalent capacitive network for a specimen of dielectric material.

When a specimen is essentially capacitive in nature, it is customary to think of it as a network of capacitor elements when studying its corona characteristics. A simple network is shown in Fig. 2.

In the figure $C_p$ represents part of the specimen not involved in the ionization path. The capacitance of an ionizable void is represented by $C_v$. This is in series with a certain amount of insulation represented by $C_s$.

The capacitance of this speciment as seen at the terminals is given below.

(1) $$C = C_p + \frac{C_v C_s}{C_v + C_s}$$

If the specimen is charged to a voltage $e$, the total charge is simply $eC$ or $Q_v$.

(2) $$Q_v = e\left(C_p + \frac{C_v C_s}{C_v + C_s}\right)$$

Now when ionization takes place, the capacitance $C_v$ becomes effectively short-circuited and there is a sudden increase in capacitance of the system. If $e$ remains constant, the net charge on the specimen must increase and the total charge now becomes $Q_s$.

(3) $$Q_s = e(C_p + C_s)$$

A small increment in charge results which must be the difference between $Q_s$ and $Q_v$. This is called apparent charge, $q$.

(4) $$q = eC_s \frac{C_s}{C_v + C_s}$$

Thus the apparent charge is independent of the parallel capacitance $C_p$.

The voltage across the void initially is $e_v$ when $e$ is applied to the specimen.

(5) $$e_v = e\frac{C_s}{C_v + C_s}$$

From (4) and (5)

(6) $$q = e_v C_s$$

The apparent charge can also be expressed as a voltage $e_1$ multiplied by the specimen capacitance C.

(7) $$q = e_1 C$$

From (6) and (7)

(8) $$e_1 = e_v \frac{C_s}{C}$$

The charge which was initially on capacitor $C_v$ is equal to $e_v C_v$ and may be considered to be the corona charge. It may be designated $q_v$.

From (6)

(9) $$q = q_v \frac{C_s}{C_v}$$

This is somewhat different from the expression derived by Ross and Curdts "Considerations in Specifying Corona Tests," Electrical Engineering, volume 56, page 258, which is given below.

(10) $$q = q_v \frac{C_s}{C_v + C_s}$$

In Equation 9 the apparent charge is slightly greater. This is so because the void capacitance is assumed to be shorted during ionization in this analysis. The difference is negligible for in practical cases $C_v$ is much greater than $C_s$.

In corona testing the voltage $e$ may be considered as the instantaneous value of the applied power-frequency test voltage. The value of $e$ is essentially unchanged by the ionization, particularly at the inception point. Also, in most cases the total capacitance of the specimen is not seriously affected by ionization. Because of this the apparent charge $q$ may be considered as the result of a change in voltage $e$ in series with a fixed capacitance C. This permits a further simplification of the network of Fig. 2. The specimen becomes simply a capacitance C with a series voltage $e_1$.

In general, only the terminals of the specimen are available for measurement. For this reason the apparent charge is measurable but not the true corona charge.

It is very desirable to be able to measure apparent charge without measuring the specimen capacitance. A circuit is presented here which permits the apparent charge to be determined for any value of specimen capacitance without the need to know its value.

To do this, a calibrating capacitor $C_0$ is made a part of the corona testing equipment. A low impedance square wave generator is connected through an attenuator in series with this capacitor.

The square wave signal may be applied simultaneously with the corona test. Height of the pulses from the square wave generator may be adjusted to coincide with the observed corona signal. Apparent charge is then equal to the product of the peak to peak voltage of the square wave and the calibrating capacitor.

Figure 3:
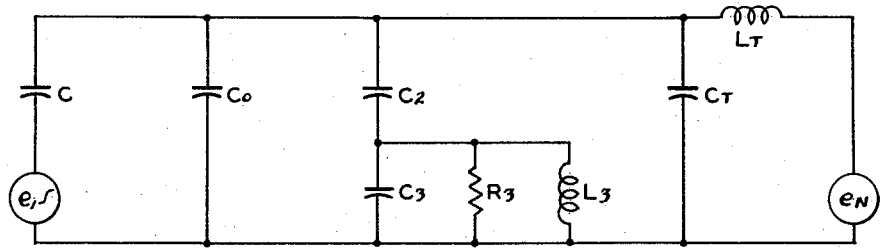
Fig. 3 is a schematic diagram of an equivalent circuit to the testing circuit.

An analysis of the circuit will demonstrate this. Fig. 3 shows the circuit of a corona detection circuit with such a calibrating capacitor.

Because the apparent charge at C is released quite suddenly, the response to it is a very rapid transient superimposed on the power frequency signal. It will save considerable effort with little loss in accuracy if we consider only the high frequency characteristics of the circuit. If this is done, $L_3$ and $L_T$ may be neglected.

Figure 4:
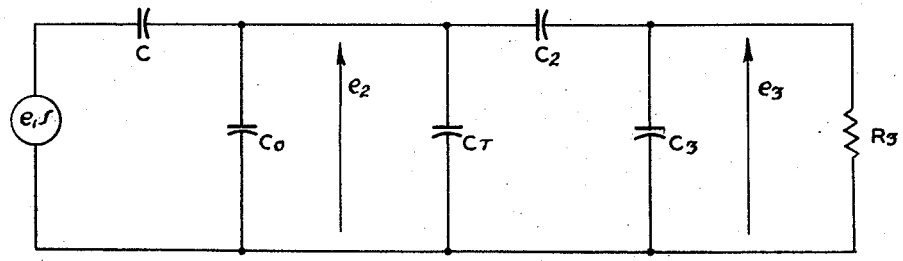
Fig. 4 is a simplification of the schematic diagram of Fig. 3 making certain assumptions.

The circuit then becomes as shown in Fig. 4 after a slight rearrangement.

In the figure, C represents specimen capacitance; $C_0$, calibrating capacitance; $C_T$, stray (bushing and transformer) capacitance; $C_2$, blocking capacitance; $C_3$, shunt capacitance; and $R_3$, detector input resistance.

The circuit lends itself to analysis by the node method. Laplace transforms for each of the two node equations may be written by inspection. Here, current and voltage transforms are indicated by capital letters.

(11) $(E_1 - E_2)CS - E_2(C_0 + C_T)S - (E_2 - E_3)C_2S = 0$

(12) $(E_2 - E_3)C_2S - E_3C_3S - E_3 1/R_3 = 0$

The matrix for these equations can be written as follows:

(13) $\begin{vmatrix} E_1 C \\ 0 \end{vmatrix} = \begin{vmatrix} C + C_0 + C_T + C_2 & -C_2 \\ -sC_2 & s(C_2 + C_3) + \dfrac{1}{R_3} \end{vmatrix}$ For convenience introduce two new terms $C_4$ and $C_5$.

(14) $C_4 = C + C_0 + C_T$

(15) $C_5 = C_2 + C_3$

Then the matrix becomes

(16) $\begin{vmatrix} E_1 C \\ 0 \end{vmatrix} = \begin{vmatrix} C_4 + C_2 & -C_2 \\ -sC_2 & sC_5 + \dfrac{1}{R_3} \end{vmatrix}$ The determinant of the system is D and the voltages can be determined by Cramer's rule as follows:

(17) $D = s(C_4C_5 + C_2C_3) + \dfrac{C_4 + C_2}{R_3}$ $= K(s + a)$ where

(18) $K = CC_2 + CC_3 + C_0C_2 + C_TC_2 + C_0C_3 + C_TC_3 + C_2C_3$

(19) $a = \dfrac{C + C_0 + C_T + C_2}{R_3 K}$

(20) $E_2 = E_1 \dfrac{CC_2}{K} \dfrac{s}{(s+a)}$

(21) $E_1 = \dfrac{e_1}{s}$

(22) $E_3 = e_1 \dfrac{CC_2}{K} \dfrac{1}{(s+a)}$

Take the inverse transform of (22) to get the equation for $e_3$.

(23) $e_3 = e_1 \dfrac{CC_2}{K} \epsilon^{-at}$

It is not apparent by an inspection of Equation 19 but the time constant $1/a$ is the product of the terminating resistance $R_3$ and the capacitance looking back into the set from the terminals with all voltage sources short circuited.

The value of the detector input pulse, $e_3$, can now be expressed in terms of apparent charge, $q$.

(7) $q = e_1 C$

From (23)

(24) $e_3 = q \dfrac{C_2}{K} \epsilon^{-at}$

Figure 5:
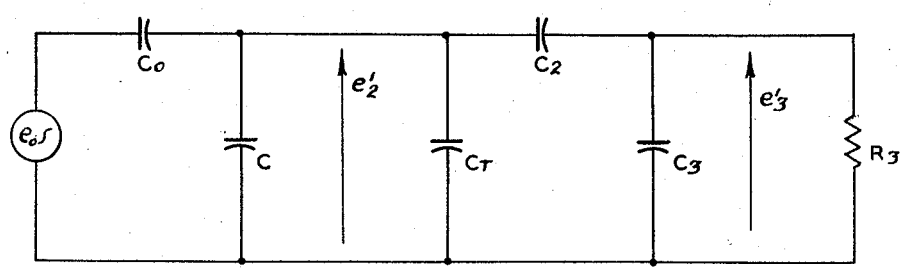
Fig. 5 is a further simplification of the circuit diagram of Fig. 3.

Now by the theory of superposition a calibrating step voltage, $e_0$, can be placed in series with $C_0$ and the effect of this can be computed using the same circuit with the corona signal short circuited. This is shown in Fig. 5.

Note that the only difference in the circuit is that C and $C_0$ are transposed and $e_1$ is replaced by $e_0$. The solution is then similar in form.

(25) $e'_3 = e_0 \dfrac{C_0 C_2}{K_0} \epsilon^{-at}$

The time constant is obviously the same in both cases because the circuit looking back from $R_3$ is unchanged. The calibrating charge is $e_0 C_0 = q_0$.

(26) $e'_3 = q_0 \dfrac{C_2}{K_0} \epsilon^{-at}$

If $e_3$ and $e'_3$ are equal then from (24) and (26)

(27) $q = q_0 \dfrac{K}{K_0}$

(28) $\dfrac{K}{K_0} = \dfrac{CC_2 + CC_3 + C_0C_2 + C_TC_2 + C_0C_3 + C_TC_3 + C_2C_3}{CC_2 + CC_3 + C_0C_2 + C_TC_2 + C_0C_3 + C_TC_3 + C_2C_3} = 1$

(29) $q = q_0 = e_0 C_0$

Thus it can be seen that the apparent charge, $q$, can be determined by a comparison process in which the calibrating pluse $e'_3$ is adjusted to the same height as the signal pulse $e_3$ by adjusting the calibrating voltage $e_0$.

When the two have the same height, the apparent charge is found from Equation 29.

It has been assumed that the rise time of the applied calibrating square wave is fast enough so that the amplitude of the resulting pulse will not be significantly reduced due to differentiating action of the network.

Figure 6:
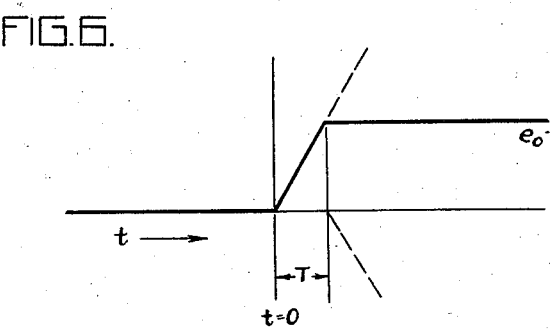
Fig. 6 represents a ramp voltage as applied to the system.

In practice it will be necessary to know how short the rise time must be in order that reliable calibration is possible. This can be determined by studying the response of the circuit to a ramp function as shown in Fig. 6.

The transform for such a function is given below.

(30) $E_0 = \dfrac{e_0}{Ts^2}(1 - \epsilon^{-sT})$

The quantity in parenthesis denotes that the corresponding time function consists of a response (1) minus a similar response ($\epsilon^{-ST}$), T seconds later. This transform is substituted in Equation 20 which is modified by substituting $C_0$ for C so that it represents the response to the calibrating signal.

(31) $$E''_3 = e_0 \frac{C_0 C_2}{T K_0} \frac{1}{S(S+a)}(1-\epsilon^{-ST})$$

(32) $$e''_3 = e_0 C_0 \frac{C_2}{K_0 a T}(1-\epsilon^{-at}) \, t < T$$

Figure 7:
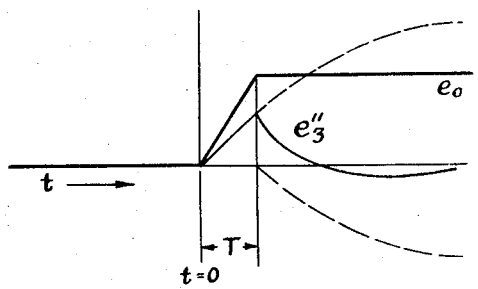
Fig. 7 represents the response of the system to the ramp voltage of Fig. 6.

The response voltage is the difference between two charging voltage curves as sketched in Fig. 7.

Note that the peak value of the response to the ramp voltage is given by the first curve at $t=T$ so that it is unnecessary to consider the second or delayed curve. At $t=T$ the value of $e''_3$ is given below.

(33) $$\text{Peak } e''_3 = e_0 C_0 \frac{C_2}{K_0 a T}(1-\epsilon^{-aT})$$

The peak value of the response to a step voltage occurs at $t=0$. It is obtained from Equation 25 as $e'_3$.

(34) $$\text{Peak } e'_3 = e_0 C_0 \frac{C_2}{K_0}$$

The ratio of responses is defined as $k$ and is given below.

(35) $$k = \frac{e''_3}{e'_3} = \frac{1}{aT}(1-\epsilon^{-aT})$$

The time constant of the network may be called $T_0$. It equals $1/a$ as shown below.

(36) $$1/a = T_0$$

(37) $$k = \frac{T_0}{T}\left(1-\epsilon^{\frac{-T}{T_0}}\right)$$

Figure 8:
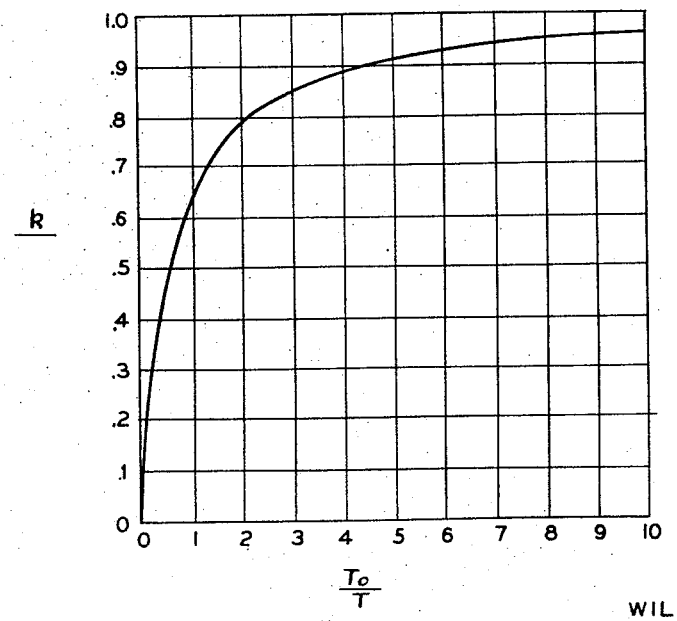
Fig. 8 is a graph of the value of $k$, the ratio of responses.

Fig. 8 shows the values of $k$ for various ratios of the circuit time constant to the rise time of an applied ramp. In practice a square wave has some rise time and this relationship will establish the effectiveness of a known square wave generator for calibration purposes.

The pulses shown on the screen area of the oscilloscope in Fig. 9 are spread out in time for clarity. The actual pulses seen are in fact vertical lines. As previously discussed, the oscilloscope 41 is connected across the inductor 30 so that sudden voltage pulses across this inductance will appear on the face of the scope 42 to interrupt a straight line time trace representative of steady state voltage conditions. For example, when corona discharge takes place across the specimen 15, it will produce a transient which will reach plate 28 of the corona free capacitor supplied within bushing 14 and hence will appear across the inductor so that a pulse 44 will appear on the scope. The magnitude of voltage appearing across capacitor 29 can be measured across the voltmeter of detector 31. The applicant has contributed the idea of applying a controlled pulse to the system by means of signal generator 25. This pulse is applied between plate 19 of the corona free bushing 16, which constitutes the calibrating capacitor, and ground across resistor 17 and because of its high frequency nature is reflected across the capacitor to lead 18 and in the same manner as the corona pulse ultimately across the impedance 29 and 30. The pulse 45 produced in this manner will not correspond in size to pulse 44 but it may be adjusted to a size 46 which does correspond to pulse 44 by an adjustment of the voltage of signal generator 25. When this condition occurs, the balance previously described obtains.

It will be seen from the above that the present invention provides a simple highly accurate means of arriving at apparent corona charge in a dielectric sample.

I claim:

1. The method of calibrating corona test equipment comprising connecting a calibrating capacitance and a terminating impedance in series across the test sample so that one side of the terminating impedance is grounded, and connecting another impedance in parallel therewith, applying a calibrating signal of known voltage across the terminating impedance, applying test voltage across the test sample and comparing the known signal detected across the other impedance with the actual corona pulse resulting from a corona discharge also detected across the other impedance.

2. The method of claim 1 in which the voltage of the calibrating signal is adjusted over a known range of values until it equals the corona pulse amplitude whereupon the product of the calibrating capacitance and the voltage amplitude of the calibrating signal equal the apparent corona charge.

3. The method of measuring the apparent corona charge of a test sample comprising simultaneously applying test voltage across the sample and a calibrating signal across a terminating impedance connected to ground and in series with a calibrating capacitance across the sample, and adjusting the calibrating signal until the amplitude of the calibrating signal and the amplitude of the actual corona pulse are equal, and thereby determining the magnitude of the apparent corona charge.

4. The method of claim 3 in which both the calibrating signal and the corona pulse are detected on a single detection means suitable for visual comparison and there visually compared as the amplitude of the calibrating signal is adjusted.

5. A corona test set comprising terminals adapted to be connected to a voltage source, a pair of specimen terminals for applying the voltage from the source across the test sample, a calibrating capacitor and terminating impedance in parallel with the specimen terminals, a signal generator connected across the terminating impedance, another impedance known as the power separation filter connected in parallel with the specimen terminals, across an inductive part of which is connected a corona pulse and calibrating signal detecting means.

6. The test set of claim 5 in which the terminating impedance across which the generator is coupled is a suitable termination for the line connecting the generator to the terminating impedance and is grounded.

7. The test set of claim 6 in which the power separation filter and calibrating capacitor are built into an insulating tank.

8. The test set of claim 7 in which the calibrating capacitor, in series with the terminating impedance, is built into a bushing of the tank.

9. The test set of claim 8 in which a capacitor forming part of the power separation filter branch is built into another bushing of the tank.

10. The test set of claim 9 in which a power supply transformer is built into the tank to provide the voltage source.

11. A corona test set comprising a corona free supply transformer adapted to have its primary connected to a voltage source, a tank for containing the transformer and adapted to be filled with insulating material, a bushing for the tank including a corona free calibrating capacitor providing a terminal for the test specimen whereby the specimen is connected across the transformer secondary, the capacitor being connected in series with a terminating impedance and said series circuit being connected in parallel across the test specimen terminals, a signal generator across the terminating impedance and means for comparing the signal from the generator with corona discharge pulses.

12. The structure of claim 11 in which a second bushing with a second capacitor built therein, parallel lines being connected through said bushings to the terminal, and the second capacitor being connected in a series circuit with an impedance which is employed to compare the voltage from the signal generator with the corona discharge pulse, said series circuit being connected across the specimen terminals.

References Cited in the file of this patent

Preprint of the American Society for Testing Materials, annual meeting held June 16–21, 1957, published as information June 19, 1957, Appendix II, pp. 9–16.